Oct. 20, 1931.  W. G. BEAUREGARD  1,828,020
BONDING MOLD
Filed Aug. 9, 1928
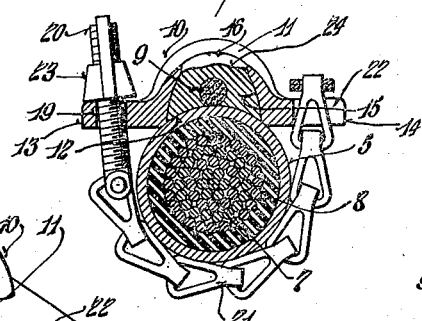
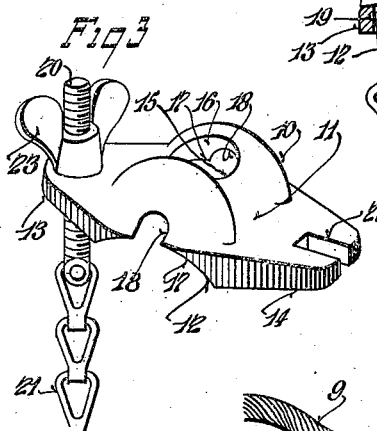
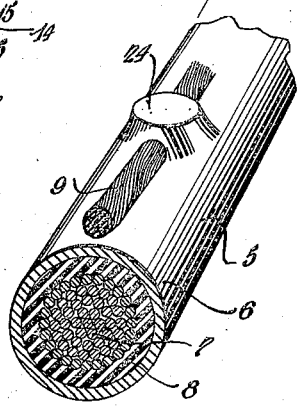
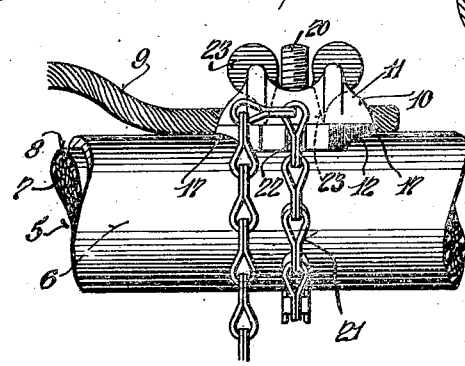
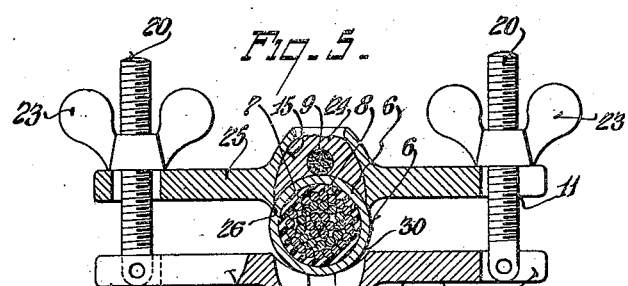
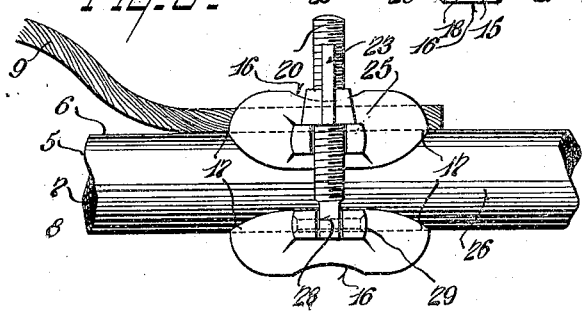
Inventor
William G. Beauregard
By Ira Milton Jones Patented Oct. 20, 1931

1,828,020

UNITED STATES PATENT OFFICE

WILLIAM G. BEAUREGARD, OF FALL RIVER, MASSACHUSETTS, ASSIGNOR, BY MESNE ASSIGNMENTS, TO LINE MATERIAL COMPANY, OF MILWAUKEE, WISCONSIN, A CORPORATION OF DELAWARE

BONDING MOLD

Application filed August 9, 1928. Serial No. 298,581.

This invention relates particularly to molds adapted for use in connecting ground wires to underground lead sheathed cables. Heretofore the attachment or bonding of a ground wire to a cable sheath has been obtained by endeavoring to solder a strip of wire to the lead sheath, but with indifferent success and, therefore, this invention has as its primary object to provide means for efficiently attaching a ground wire to a lead cable sheath.

And a more specific object of this invention resides in the provision of a device readily detachably connectible with a cable which simultaneously clamps the ground wire to the cable sheath and provides a mold for pouring solder or other like material around the ground wire to secure the same to the cable sheath.

With the above and other objects in view which will appear as the description proceeds, my invention resides in the novel construction, combination and arrangement of parts substantially as hereinafter described and more particularly defined by the append claims, it being understood that such changes in the precise embodiment of the herein-disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a cross sectional view through a lead cable illustrating my improved bonding mold applied thereto and showing the solder or like material already poured around the ground wire;

Figure 2 is a side elevational view thereof;

Figure 3 is a perspective view of the bonding mold removed from the cable;

Figure 4 is a perspective view illustrating a section of cable with a ground wire attached thereto by my improved method;

Figure 5 is a view similar to Figure 1 illustrating a slightly modified form of my invention, and Figure 6 is a side elevational view thereof.

Referring now more particularly to the accompanying drawings in which like numerals designate like parts throughout the several views, the numeral 5 represents a cable having an outer lead sheath 6 and a plurality of conductor wires 7 insulated from the lead sheath by insulation 8. A ground wire 9 which is preferably flexible is laid longitudinally on the cable and secured thereto at a point at which the lead sheath 6 has been scraped clean, by my improved clamp or bonding mold 10.

The clamp or bonding mold consists of a member 11 having an arcuate groove 12 in its under surface, the radius of which is substantially that of the outside diameter of the cable and from which a pair of arms 13 and 14 extend. Communicating with the arcuate groove 12 is an enlarged inverted cup shaped recess 15, the upper end of which is open, as at 16, and extending through the end walls 17 of the recess 15 are aligned notches 18 which correspond to the size of the ground wire 9 so as to straddle the same and securely clamp it to the lead sheath when the bonding mold is secured thereto.

The arm 13 is apertured, as at 19, to receive a screw 20, to the lower end of which is connected a flexible chain 21 which is passed under the cable and brought upwardly on the other side thereof to be inserted in a slot 22 formed in the arm 14. A wing nut 23 threaded on the outer end of the screw 20 provides means for drawing the chain taut to clamp the bonding mold to the cable, as will be readily apparent.

The recess 15 is thus closed at its bottom by the cable and the ground wire and solder or other like material 24 is inserted into the recess to embed the ground wire 9 therein and securely connect it with the lead sheath of the cable. The solder 24 may be poured through the opening 16 in the mold or may be inserted in any other desired manner. After the solder has cooled sufficiently the mold is removed and the ground wire remains efficiently and securely attached to the lead sheath of the cable, as shown in Figure 4.

In Figures 5 and 6 are illustrated a slightly modified form of my invention adapted particularly for use in connection with cables of smaller diameters and in this instance the chain 21 is dispensed with and a pair of bonding molds is provided, the upper mold 25 being substantially identical to the mold 10 except that its arcuate recess 26 is formed with a smaller radius. The bottom mold 27 is also similar to the mold 10 and has a pair of screws 20 secured in recesses 28 in the outer end of each arm 29. The arcuate recess 30 of the lower mold is formed with a larger radius than that of the upper mold so as to accommodate a larger diameter cable thereby permitting the device to be used for two different sizes of cable.

From the foregoing description taken in connection with the accompanying drawings, it will be readily apparent to those skilled in the art to which an invention of this character appertains that I have provided a bonding mold which facilitates the connection of a ground wire to the lead sheath of a cable and which is readily detachably connectible with the cable to maintain the ground wire in secure contact with the surface of the cable during its connection therewith.

What I claim as my invention is:

1. A device for attaching a ground wire to a cable, comprising a member having a central opening, means connected with the opposite ends of the member for readily securing the same to the cable with the cable providing the bottom for the opening, and said member having a recess communicating with the opening through which the ground wire projects into the opening where it is held by the member.

2. A device for attaching a ground wire to a cable, comprising a yoke member having an opening and an arcuate groove in its bottom to snugly engage the annular wall of the cable and close the opening, means for readily detachably clamping the member to the cable, and said member having recesses in the walls of the opening through which the ground wire extends to be rigidly held against the surface of the cable where it is secured by metal poured into the opening.

3. A device for attaching a ground wire to a cable, comprising a yoke member having an opening and oppositely extending arms, means carried by the arms and engageable with the underside of the cable for readily detachably connecting the member with the cable so that the cable closes the bottom of the opening to form a mold, screw means for drawing said means taut, and means whereby the yoke member clamps the ground wire to the cable with a portion thereof received in the mold formed by the opening.

4. A device for attaching a ground wire to a cable, comprising a member having a central opening extending therethrough and a curved surface engageable with the cable whereby the cable closes the bottom of said central opening to form a mold, one wall of said opening being recessed to receive the ground wire and clamp the same against the cable substantially longitudinally thereof, arms extended from the member and arranged transversely to the axis of the cable, and means connected with the arms for readily detachably securing the member in operative position on the cable.

5. A device for attaching a ground wire to a cable, comprising a member having an arcuate surface adapted to fit against the cylindrical surface of the cable, an opening extending through the member to be closed at its bottom by the cylindrical surface of the cable and form a mold, and a recess communicating with the opening to receive the ground wire and clamp the same to the cable with a portion thereof within the mold, and means connected with the opposite sides of said member and encircling the cable for readily detachably mounting said member on the cable and pressing it against the cylindrical surface of the cable.

6. A mold for use in forming a boss upon a sleeve comprising in combination a body adapted to fit against the surface of said sleeve and having an aperture of the shape of such boss opening against said surface, and means cooperating with said body to encircle the said sleeve to press the body against the sleeve.

7. A mold for use in forming a boss upon a sleeve comprising in combination a body adapted to fit against the surface of said sleeve and having an aperture of the shape of such boss opening against said surface, a strap adapted to encircle said sleeve to clamp said body thereto, and means for fastening said strap to said body including a screw threaded connection adjustable to press said body tightly against said surface.

In testimony whereof I have hereunto affixed my signature.

WILLIAM G. BEAUREGARD.